United States Patent Office 3,510,957
Patented May 12, 1970

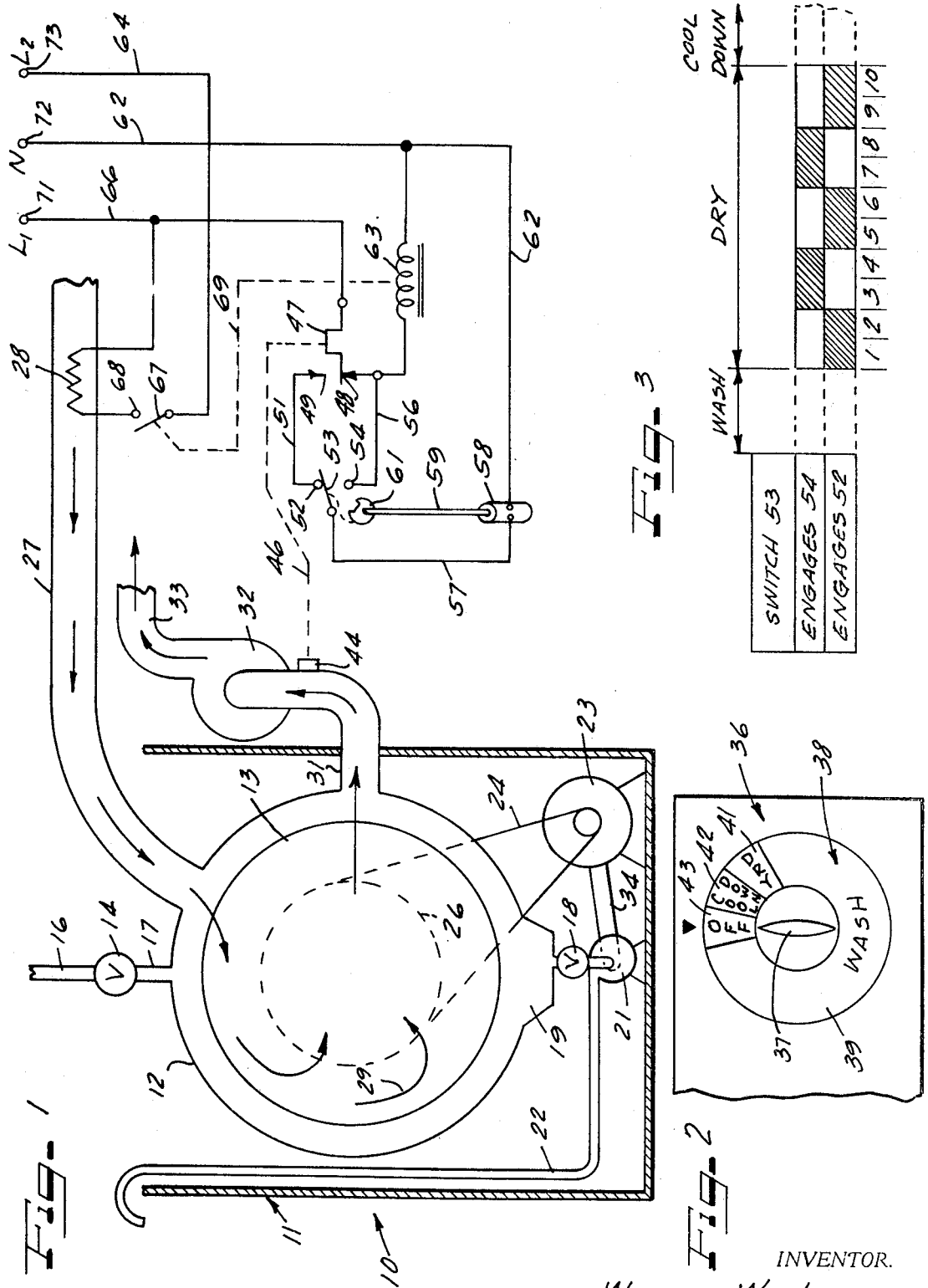

3,510,957
DRYER CONTROL SYSTEM
Wilbur W. Jarvis, Benton Harbor, Mich., assignor to Whirlpool Corporation, Benton Harbor, Mich., a corporation of Delaware
Filed Mar. 20, 1968, Ser. No. 714,486
Int. Cl. F26b 21/06
U.S. Cl. 34—53
10 Claims

ABSTRACT OF THE DISCLOSURE

A dryer control for a washer-dryer which uses temperature responsive means in cooperation with timer means to count the number of times the heater is turned off and back on near the end of the drying cycle and terminates operation of the dryer after a predetermined cumulated total. The timer is advanced when the heater is cut off thermostatically as well as when operation of the heater is re-initiated. The specific sequencing of the timer is such as to advance the timer out in a stepwise manner under the control of the exhaust stack thermostats.

CROSS REFERENCE TO RELATED APPLICATION

The dryer control system of this invention is applicable to washer-dryers such as described in the application entitled Control Circuit for a Laundry Appliance, invented by Ralph S. Odle, Jr., and Theodore Kotyuk and assigned to the assignee of this invention, Ser. No. 718,-433 filed Apr. 3, 1969.

BACKGROUND OF THE INVENTION

Field of the invention

This invention relates generally to dryers and more specifically to a control circuit for regulating the operation of a domestic clothes dryer.

Description of the prior art

Pat. No. 1,519,234 to Bolze et al., discloses a heater control circuit in which a stepping switch cooperates with a bimetallic switch to alternately power and de-energize a heater. However, the stepping switch is not a timer and the principle of "overlapping" the closing of timer switches to control timer advancement is not shown or disclosed in this patent. Also, the heated bimetallic switch of this patent does not function as a thermostat. Further, the heater control of Bolze et al. is not utilized as a dry control circuit in a laundry appliance as in the present invention.

Patents 2,796,679 and 2,815,416 are directed to ratchet mechanisms which "count" the number of times a dryer heater is "cycled" and terminate operation after a preset number of such cycles. However, in both of these patents, the ratchet mechanism advances either when the heaters are turned on *or* off, not during both operations as in the present invention.

SUMMARY OF THE INVENTION

A method and apparatus for controlling a dryer which uses temperature responsive means in cooperation with timer means to count the number of times the heater is turned off and back on near the end of the drying cycle and which terminates operation after a predetermined total number of cycles. The dryer control advances the timer both when the thermostat cuts off the heaters and also when it turns them back on. A first control switch is controlled by a cam driven by the timer and a second switch, connected in circuit with the first switch, is controlled by a thermostat which senses the temperature in the exhaust duct of the dryer. The second switch controls the heater of the dryer and the first and second switches are so connected that the timer motor is advanced both when the thermostat cuts off the heater and also when it turns it on.

The method of utilizing a very small portion of a timer switch to control the drying cycle in a washer-dryer combination is disclosed.

Other objects, features and advantages of the present invention will be readily apparent from the following detailed description of a preferred embodiment thereof taken in conjunction with the accompanying drawings.

BRIEF DESCRIPTION OF THE DRAWING

FIG. 1 is a schematic illustration of a combination washer-dryer and the portion of its control circuitry comprising the instant invention;

FIG. 2 is a partial view of the control console of a washer-dryer using the instant invention; and FIG. 3 is a program chart showing the closure sequence of switches activated by the timer of the washer-dryer.

DESCRIPTION OF THE PREFERRED EMBODIMENT

FIG. 1 illustrates schematically a combination washer-dryer designated generally as 10 which includes a cabinet 11 which has supported therein a cylindrical water-tight tank 12. A cylinder 13 is journalled within the tank 12 for rotation. An inlet valve 14 is connected to an input conduit 16 to supply water to the tank 12. A vacuum break 17 is mounted between the valve 14 and the tank 12. Drainage of water from the tank 12 is controlled by a valve 18, which when actuated, allows water to be pumped from the sump 19 through a pump 21 and out a drain conduit 22. A motor 23 drives pump 21 with a belt 34. The motor 23 also rotates the cylinder 13 with a belt 24 and pulley 26.

During drying operation of the washer-dryer, air is drawn through an inlet duct 27 over an electric heater 28. Although an electric heater is illustrated, it is to be realized, of course, that a gas burner or other suitable heating means may be utilized. The heated air passes via duct 27 into the tub 12 of the washer-dryer and through the perforated cylinder 13. The path of the heated air is generally indicated by the arrows 29. After passing through the clothing within the cylinder 13, the air passes out a conduit 31 to a suction blower 32 and through exhaust conduit 33. A thermostat 44, or other suitable temperature sensing means is mounted in the conduit 31 so as to monitor the exhaust temperature of the air passing through the conduit.

Since the present invention relates to the dryer control for a combination washer-dryer, the detailed description of the control circuitry for the valves 14 and 18, the driving motor 23 and pump 21 will not be given, since such circuits and structure are well known to those skilled in the art.

FIG. 2 is a partial view of the control console 36 of a washer-dryer utilizing the present invention, and has a timer dial 38 that may be moved by the knob 37. It is to be particularly noted that a major portion 39 of the timer dial 38 is devoted to the wash cycle. A relatively small portion 41 is devoted to the dry cycle, a small portion 42 is devoted to the cool-down portion, and segment 43 indicates when the washer-dryer is off.

It is advantageous to have the dryer control segment 41 relatively small so that a highly flexible washing operation can be obtained due to the large portion of the timer devoted to it. Section 41 of a particular timer dial according to this invention, is the only portion of the timer which need be utilized for the control of the drying operation. In the dryer of this invention, this segment represents approximately ten minutes of timer time.

As shown in FIG. 1, the heart of the instant invention comprises a single pole, double-throw switch 53 which is actuated by the timer motor 58, and a single pole, double-throw, thermostatically-actuated switch 47. The switch contact 47 moves between contacts 48 and 49 and is mechanically linked by linkage 46 to the thermostat 44 mounted in conduit 31. Switch contact 53 moves between contacts 52 and 54. Contact 52 is connected by lead 51 to contact 49 and contact 54 is connected by lead 56 to contact 48. A cam 61 engages the contact 53 to move it between contacts 52 and 54. Cam 61 is mounted on shaft 59 of the timer motor 58 to control the position of contact 53. Lead 57 connects contact 53 to one terminal of the timer motor 58. A second contact to timer motor 58 is connected by lead 62 to a neutral terminal 72. Lead 56 is connected to a heater-energizing relay 63 which has its other side connected to the neutral terminal 72 of the power supply. Switch contact 47 is connected by lead 66 to a terminal 71 of the power supply. Heater 28 has one side connected to the lead 66. Contact 73 of the power supply is connected by lead 64 to a switch contact 67. Switch contact 67 is engageable with a contact 68 which is connected to the other side of the heater 28. Linkage 69 extends between the switch contact 67 and the heater relay 63.

A suitable voltage supply is connected between the terminals 71, 72 and 73. For example, terminal 72 may be a neutral terminal and have 110 volts respectively between it and terminals 71 and 73. Terminals 71 and 73 may have 220 volts between them.

During most of the drying operation, when heated air is absorbing considerable moisture from the clothing in the cylinder 13, the air passing through conduit 31 is at a relatively low temperature. However, near the end of the drying cycle, when most of the moisture has been removed from the clothing, the temperature of air passing through conduit 31 rises. The thermostat 44 is calibrated to trip switch contact 47 so that it moves from engagement with contact 48 and then into engagement with contact 49 at a temperature of 135° F., for example. Thus, while clothing within the cylinder 13 is still damp, the air passing through the conduit 31 will be below the temperature of 135° F., and switch contact 47 will remain in engagement with contact 48. As drying occurs, and air temperature in conduit 31 rises above the 135° F. trip point, the switch 47 will move into engagement with contact 49.

When the wash portion of the cycle corresponding to segment 39 on the timer console 36 has been completed, the switch 53 will be in engagement with contact 52 as shown in FIGS. 1 and 3. Switch 47 will be in engagement with contact 48 and the timer motor 58 will not operate, since the current path to the motor is open. However, power is supplied to the relay 63 from terminal 71, lead 66, switch contact 47, contact 48, and terminal 72. This energizes the relay 63 which closes switch 67 to connect the heater 28 across terminals 71 and 73. The machine is now in a normal drying operation and remains in this condition so long as the switch 47 remains in contact with contact 48.

As the clothing within the cylinder 13 starts to dry, the air temperature in conduit 31 will rise above 135° F., and thermostat 44 will move switch 47 through linkage 46 out of engagement with contact 48 and into engagement with contact 49. This disconnects power to the relay 63 and the heater switch 67 opens to turn off the heater. Switch 47 now supplies power to the timer motor 58 through contact 49 and switch 53, which engages contact 52. The timer motor thus starts to advance the drive cam 61. The timer motor 58 and cam 61 are selected so that the switch 53 is moved at predetermined times in accordance with the FIG. 3 sequence chart. For example, in this embodiment, the timer motor and cam 61 move the switch 53 for two minute increments as shown in FIG. 3. It is to be realized, of course, that the timer motor cam 61 may be selected so as to utilize other times, but in this example the energized time of two minutes will be used. Thus, after two minutes the timer-actuated switch 53 is moved by the cam 61 from engagement with contact 52 to engage contact 54. This again disconnects power from the timer motor 58 and it will stop.

After a period of time, sufficient for the clothing in the cylinder 13 to cool down, the temperature in conduit 31 will drop and thermostat 44 will move switch contact 47 from engagement with contact 49 to engagement with contact 48. This reenergizes relay 63 which closes the heater switch 67 so that the heater 28 is again energized. The timer motor 58 is also energized through switch contacts 53, 54, lead 56, contact 48 and switch 47. The timer motor 58 will then run for a period of two minutes, and will then move contact 53 from engagement with contact 54 to engagement with contact 52. Thus, the timer advances from two minutes to four minutes as shown in FIG. 3, whereupon the contact moves from engagement with contact 54 to engagement with contact 52, once again stopping the timer motor 58. The motor will remain stalled until the exhaust temperature in conduit 31 causes the thermostat 44 to move contact 47 from engagement with contact 48 to engagement with contact 49. This again disconnects the heater and re-energizes the timer motor for a two minute period. The timer will then advance from four to six minutes when contact 47 moves from engagement with contact 48 to contact 49. The timer motor 58 will be advanced from six minutes to eight minutes when the switch contact 47 transfers back from contact 49 to contact 48. Upon movement of the switch 47 from terminal 48 to terminal 49, the timer motor 58 will advance to ten minutes which terminates the drying operation.

It is seen that the present dry control according to this invention is extremely advantageous for use with a combination washer-dryer wherein only a small segment of the time is available to control the drying operation. It should be particularly noted that accurate control over the drying operation is obtained for the following reason: If a large load is being dried, the heat-up and cool-down time near the end of the cycle of operation will be quite extended. However, if a small load is being dried, the heat-up and cool-down time will be shorter than with a large load and thus the end moisture retention of a small load of clothing will be comparable to that of a large load of clothing. Thus, the machine automatically adjusts to the size of load as well as the quantity of moisture in the particular load.

The dry control of the present invention is especially advantageous when used with a combination washer-dryer since only a small segment of the timer cam stack need be devoted to switching controlling the dryness operation leaving the rest free to control other portions of the cycle.

Although minor modifications might be suggested by those versed in the art, it should be understood that I wish to embody within the scope of the patent warranted hereon all such modifications as reasonably and properly come within the scope of my contribution to the art.

The embodiments of the invention in which an exclusive property or privilege is claimed are defined as follows:

1. A control circuit for a laundry machine having a heater means, temperature responsive means connected in circuit with the heater means to turn it on and off, a timer connected in circuit with the temperature responsive means whereby said timer is advanced a predetermined interval each time the heater means is turned off and each time the heater means is turned on to control the heater and terminate the drying cycle after the heater has been turned off and on a predetermined number of times.

2. A circuit according to claim 1 wherein the temperature responsive means comprises a first switch connected in circuit with the heater and having a movable contact and first and second contacts, and a temperature sensor mounted to monitor temperature in the laundry machine and connected to the movable contact of the first switch.

3. A circuit according to claim 2 comprising a second switch with a movable contact and first and second contacts connected to first and second contacts of the first switch and the timer coupled to the second switch to move the movable contact between the first and second contact.

4. A control circuit for a laundry machine having a heater, temperature responsive means connected in circuit with the heater means to turn it on and off, a timer connected in circuit with the temperature responsive means whereby said timer is advanced both when the heater means is turned off and when the heater means is turned on to control the heater and terminate the drying cycle after the heater has been turned off and on a predetermined number of times wherein the temperature responsive means comprises a first switch connected in circuit with the heater and having a movable contact and first and second contacts, a temperature sensor mounted to monitor temperature in the laundry machine and connected to the movable contact of the first switch, a second switch with a movable contact and first and second contacts connected to first and second contacts of the first switch and the timer coupled to the second switch to move the movable contact between the first and second contacts and the timer comprises a timer motor with an output shaft and a cam mounted on the output shaft and engageable with the movable contact of the second switch to move it to engage the first and second contacts.

5. A circuit according to claim 4 comprising a power supply with a first side connected to the movable contact of the first switch and heater energizing means connected between the other side of the power supply and the first contact of the first switch.

6. A circuit according to claim 5, a heater switch connected in circuit with the heater, and the heater energizing means connected to the heater switch.

7. A circuit according to claim 6, wherein the heater and heater switch are connected across the power supply.

8. A circuit according to claim 7 wherein the timer motor has one terminal connected to the other side of the power supply and the second terminal of the timer motor connected to the movable contact of the second switch.

9. A control circuit for a laundry machine having a heater, temperature responsive means connected in circuit with the heater means to turn it on and off, a timer connected in circuit with the temperature responsive means whereby said timer is advanced both when the heater means is turned off and when the heater means is turned on to control the heater and terminate the drying cycle after the heater has been turned off and on a predetermined number of times, and having inlet and outlet ducts, with the heater mounted in the inlet duct and the temperature responsive means mounted in the outlet duct.

10. The method of controlling a heater in a laundry machine comprising,
 sensing the temperature in the machine to turn the heater on and off, and
 energizing a timer each time the heater is turned on and each time the heater is turned off and controlling termination of the drying cycle with the timer.

References Cited

UNITED STATES PATENTS 3,238,636   3/1966   Chafee et al. _____ 34—48 X

JOHN J. CAMBY, Primary Examiner